United States Patent [19]
Kain

[11] 4,011,938
[45] Mar. 15, 1977

[54] SUSPENSION IDLER

[76] Inventor: Arthur F. Kain, 1726 Virginia Court, Lakeland, Fla. 33803

[22] Filed: Sept. 8, 1975

[21] Appl. No.: 611,312

[52] U.S. Cl. .............................. 198/824; 198/501; 308/20; 308/78

[51] Int. Cl. .......................................... B65g 15/08

[58] Field of Search .......... 198/192 R, 192 A, 824, 198/501; 308/20, 202, 238, DIG. 8, 78; 184/65, 7 C; 74/240

[56] References Cited

UNITED STATES PATENTS

| 652,089 | 6/1900 | Dangler | 184/65 |
|---|---|---|---|
| 2,781,124 | 2/1957 | Troller | 198/192 A |
| 2,869,710 | 1/1959 | Stewart | 308/20 |
| 2,876,890 | 3/1959 | Baechli | 198/192 A |
| 2,895,594 | 7/1959 | Smith | 198/192 A |
| 3,033,352 | 5/1962 | Kain | 198/192 |
| 3,058,573 | 10/1962 | Presti | 198/824 |
| 3,059,757 | 10/1962 | Baechli | 198/192 |
| 3,068,995 | 12/1962 | Poundstone | 198/192 |
| 3,092,240 | 6/1963 | Tyler et al. | 198/824 |
| 3,182,787 | 5/1965 | Lorenz | 198/192 |
| 3,438,100 | 4/1969 | Moore | 198/192 |
| 3,909,087 | 9/1975 | Cairns | 308/238 |

FOREIGN PATENTS OR APPLICATIONS

| 1,277,484 | 10/1961 | France | 308/DIG. 8 |
|---|---|---|---|
| 1,079,546 | 4/1960 | Germany | 198/192 A |
| 329,132 | 5/1930 | United Kingdom | 198/192 |

*Primary Examiner*—Samuel Scott
*Assistant Examiner*—Allan R. Burke
*Attorney, Agent, or Firm*—Duckworth, Hobby, Orman, Allen & Pettis

[57] ABSTRACT

A conveyor idler and idler terminal bearing apparatus has a one-piece molded, elongated, flexible polymer idler having a plurality of rollers formed thereon and having a tread formed on the surface thereof. Each end of the idler has an enlarged portion which is engaged by terminal supports surrounding the enlarged portion to rotatable hold the idler to its' mount. The terminal supports may have a steel pin or the like mounted thereto for mounting to the conveyor idler mount.

13 Claims, 4 Drawing Figures

SUSPENSION IDLER

BACKGROUND OF THE INVENTION

The present invention relates to conveyor idlers and especially to the combination of conveyor idlers and their terminal bearings and for mounting the conveyor idlers to a conveyor for supporting a conveyor belt or the like.

In the past, it has been common to provide troughing idlers for conveyor belts and these included flexible troughing idlers of the suspension type. Flexible troughing idlers of the suspension type have achieved commercial success as substitutes for a previously conventional type of troughing idler having rigid rollers mounted on fixed axes. One such flexible troughing idler of the suspension type includes that illustrated in U.S. Pat. No. 3,876,890 which provides for an idler structure molded on a wire cable in which the wire cable is held to each end by two terminal conventional metal bearings and in which the molded rollers are molded from neoprene. One disadvantage of this prior art idler is that it requires a great variety of mounts to fit each of many types of conveyor belts which require different vertical and horizontal adjustments of the outer ends of the idlers. The location of the supported ends of the idlers determines the curvature of the trough formed by the conveyor belt. Variations of the type of material to be conveyed frequently calls for various trough depths and curvatures. In installations using previous conventional composite troughing idlers formed of individual rotatable rollers, adjustment of the outer ends of the outer rolls was seldom provided for and any desired degree of troughing was determined by the angularity of the axis of the end rollers with respect to the permanent horizontal axes of the intermediate roller. Since the rollers have rigid inflexible axes, adjustment of the ends to vary troughing curvatures is a necessity on a radius determined by the roller length. With the advent of the flexible, suspension type troughing idlers, adjustment of the suspension point became more feasible. In my prior U.S. Pat. No. 3,033,352 for a Conveyor Idler Mounting Means and Support, I provided an adjustable support for the outer extremities of idler support rollers for conveyor belts of a flexible suspension type troughing idlers which provided for a lateral adjustment to be automatically affected as an incident to the vertical adjustment. These prior art flexible troughing idlers and mounts have worked satisfactorily for many years, but the rise in the cost of raw materials has substantially increased the price of the terminal bearings and thereby substantially increased the cost of suspension troughing idlers and their supporting systems. It is accordingly one advantage of the present invention to provide a molded conveyor idler and terminal bearing combination which is easily formed of polymer materials for providing the necessary strength to support conveyor belts for long periods without failure. In addition to the increased economy, the use of plastics in the bearings allows the bearings to operate without lubricants or with water as a lubricant thereby providing idlers and terminal bearings more suitable in the food industry. It has been widely considered in the conveyor idler field that plastic bearings would not be sufficiently strong to support idlers. Through the utilization of predetermined plastics along with specially designed terminal support bearing structures interconnected with steel members, a conveyor idler and bearing combination can be provided with sufficient strength to support conveyor belts over long periods without failure.

SUMMARY OF THE INVENTION

A conveyor idler and idler terminal bearing apparatus has been provided having a one-piece molded, elongated polymer flexible idler member which may be made of urethane plastic, or the like, having a plurality of rollers formed thereon, each roller having a tread on its' surface. The idler member has a pair of enlarged end portions and a pair of terminal supports enclosing the enlarged end portions of the idler members and rotatably supporting each end of the idler member. The terminal supports may have a steel pin passing therethrough for attachment to the idler support framework. The terminal support member may be made of delrin plastic and may be designed so that two support members fit over an enlarged end portion of the idler member and a casing places thereover for holding the terminal support members together and a pin can be placed therethrough for holding the casing to the support members and for connecting the support members to the mounting framework. Grease or water connections may be provided for lubricating the terminal supports where it rotatably engages the end portions of the idler.

BRIEF DESCRIPTION OF THE DRAWINGS

Other objects, features and advantages of the present invention will be apparent from the written description and the drawings in which.

DESCRIPTION OF THE PREFERRED EMBODIMENTS

Figure 1:
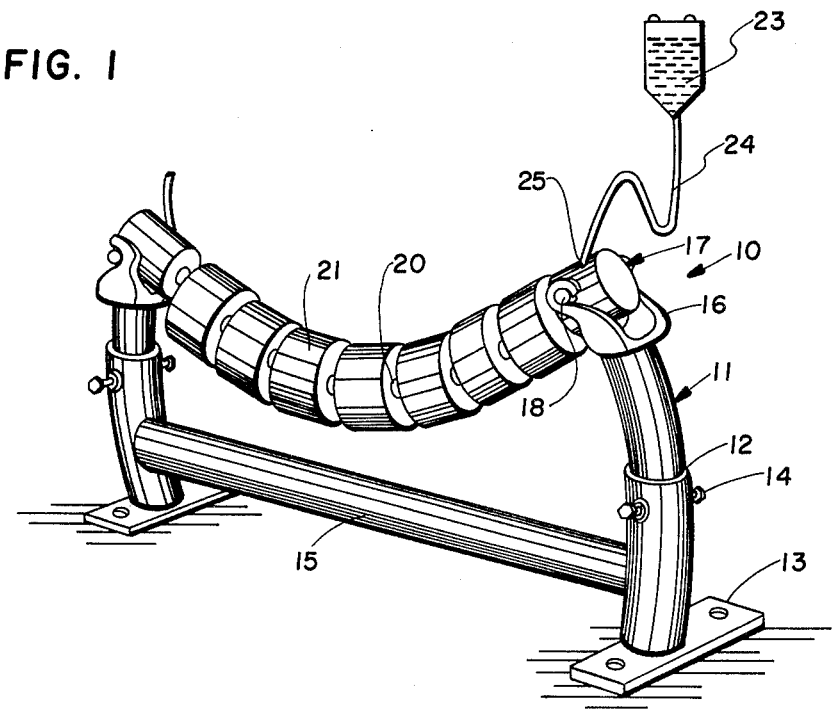
FIG. 1 is a perspective view of a conveyor idler mounted to a conveyor mounted framework with a water line connected thereon for lubricating the bearing surfaces.

Referring now to FIG. 1, a flexible troughing idler of the suspension type is illustrated at 10 incorporating the present invention and including the troughing idler mounting means 11 which is telescoped at 12 to a flange support 13. The telescoping mount may be adjustably held by set screws 14 and a pair of mounting means are held together by the connecting bar 15. Each of the mounting frameworks include a bifurcated stirrup type bracket 16 which supports a terminal bearing 17 with a pin 18. Terminal bearing 17 supports the troughing conveyor idler 20 having a plurality of rollers 21 formed therein. Each roller 21 has a special tread 22 thereon which will be described in more detail hereinafter. A conveyor belt rides on top of the rollers 21 of the idler 20 and since the idler 20 is one formed piece with the rollers 21, the entire idler 20 must rotate as the conveyor belt moves thereover and must provide a bowed trough shape for the conveyor belt to ride in for conveying material thereover.

FIG. 1 is illustrated having a small water tank 23 which is mounted above the troughing idler and mounting support 10 so that water may be conveyed by gravity through small pipes 24 and through T-connections 25 and fed into each bearing 17 for lubricating and cooling each bearing as desired.

The present invention advantageously molds the entire idler 20 of urethane polymer (isocyanate resin) which provides the necessary strength but is self-lubricating to the point that the conveyor belt would tend to slide thereover without rolling the roller 21 and for this reason the tread 22 must be formed into the surfaces of the roller 21. The urethane plastic has sufficient strength to allow molding without a wire cable or chain formed in the idler 20.

Figure 4:
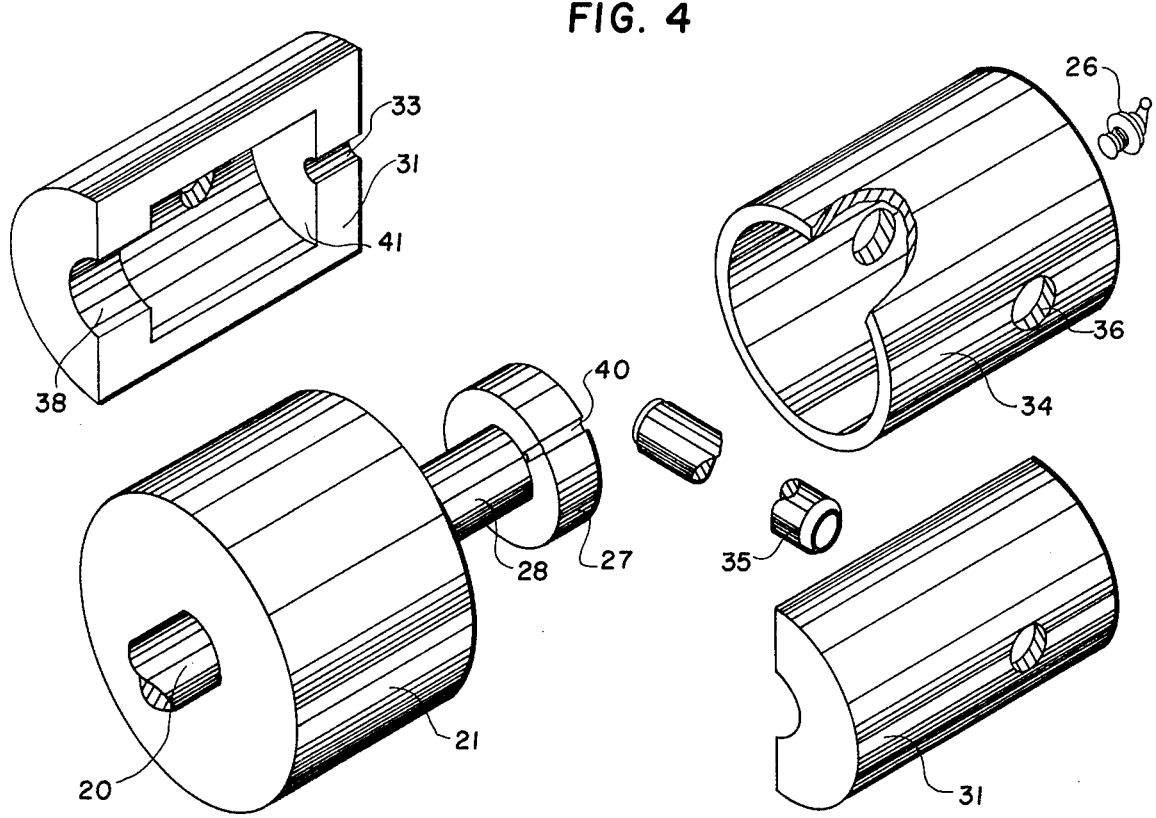
FIG. 4 is an exploded view of the embodiment of FIGS. 2 and 3.
Figure 2:
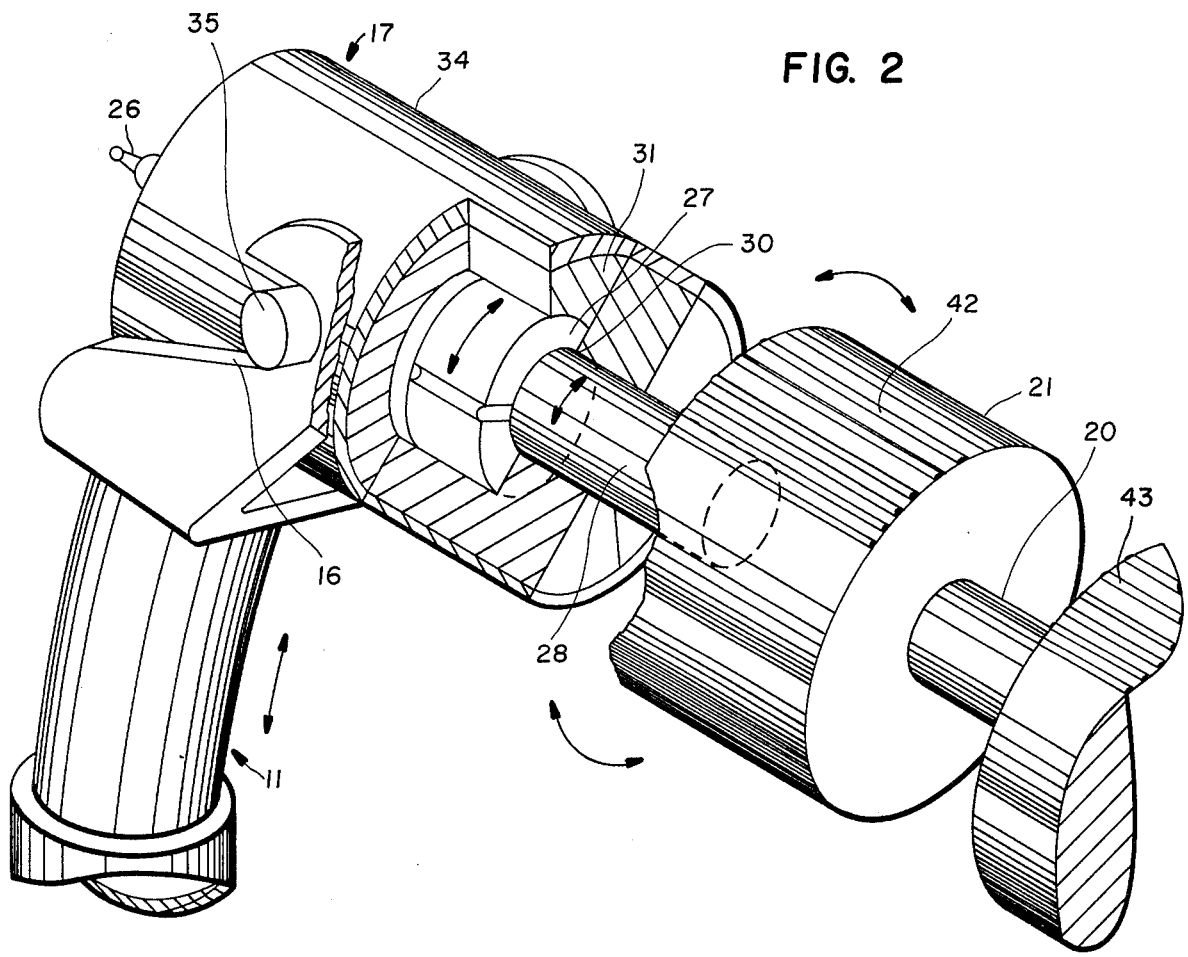
FIG. 2 is a cutaway perspective view of a terminal bearing connected to an idler and to its mount.
Figure 3:
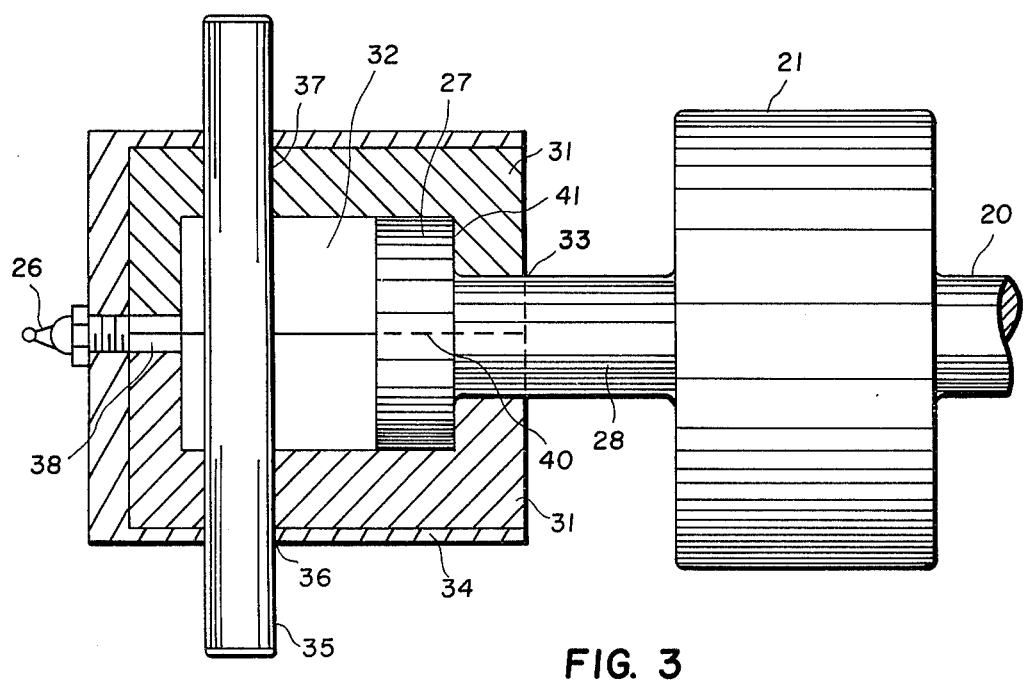
FIG. 3 is a sectional view of the embodiment of FIG. 2.

Turning now to FIGS. 2 through 4, a more clear understanding of the operation of the idler 20 in connection with the terminal bearing 17 is more clearly illustrated. The terminal bearing 17 in FIGS. 2 through 4 has been modified only to the extent that a grease fitting 26 has been substituted for the T-fitting 25 which supplied water to the bearing 17 to illustrate the features that grease or water may be utilized with bearing 17 which operates with self-lubricating plastics bearing against each other and without the increased friction of metallic or other surfaces. The idler 20 has end portions 27 connected thereto by shaft 28 which end portions 27 are enlarged and shaped to be enclosed in the bearing 17. The enlarged portion 27 has a small radiused surface 30 connecting it to the shaft 28 and may be molded as one piece with the idler 20 and would therefore be made of urethane plastic. The enlarged portion 27 of the idler 20 is enclosed by a pair of idler support members 31, which when placed together, have a chamber 32 formed therein with an opening 33 for the shaft 28 to pass through while holding the enlarged disc 27 within the chamber 22. The idler holding members 31, in combination with the enlarged portion 27, form the terminal bearing for the idler 20 and are held together by casing 34 which slides over the idler support halves 31. The casing 34 may be held to the support halves 31 by a stainless steel pin 35 which is pressure fitted through the casing 34 openings 36 and through the bores 37 passing through the support halves 31. The protruding portions of the pin 35 may then be placed in the bifurcated stirrup 16 for holding the terminal bearing to the mounting framework 11. Thus, a metal to metal contact is formed between the stainless steel pin 35 and the metal stirrup 16, even though it should be clear that other materials can be utilized for the pin 35 without departing from the spirit and scope of the invention. At any rate the bearing surfaces are provided by the enlarged end portion 27 of the idler 20 in contact with the plastic halves 31 which may be made of a plastic such as an acetal resin, especially a long-chain polymer of formaldahyde (delrin) to provide a lubricating action with the urethane members 27. These supporting members 31 however can also be made of urethane and cooled by water passing therein as illustrated in FIG. 1 or by grease through the grease fitting 26 passing through a passageway 38. In either event a small passageway 40 is provided in the enlarged portion 27 to allow the water or grease to work its way into the wear surfaces 41 located between the enlarged end portion 27 and the supportive members 31. Rollers 21 of the idler 20 is illustrated as having a plurality of treads 42 on each roller, with each tread aligned so as to be offset from a tread member 43 on the next roller 21 so as to continuously alternate engaging surfaces with a conveyor riding thereon. This assures rotation of the idler 20 when the conveyor belt moves thereacross to overcome the resistance of the bowed idler 20 having to have all rollers roll simultaneous.

It should be noted at this point that a simplified terminal bearing for a suspension conveyor idler structure has been provided. It should, however, be clear that variations are contemplated, such as the casing 34 being made of a polymer or of a metal as desired without departing from the spirit and scope of the invention. The idler members and its' rollers are all molded of one polymer material having a tread molded on to each roller and the enlarged supporting end portions of the idlers have radiused surfaces 30 which increase the strength between the end shaft 28 of the idler 20 and the enlarged portion 27 which forms the terminal bearing when enclosed by support members 31. It should, for instance, be clear that the pin 35 can be shaped differently or formed with more than one pin to accommodate different types of connections in place of the bifurcated stirrup 16 or can be replaced with slots on either side for placement between prongs or tines on the supporting framework. Accordingly, the present invention is not to be construed as limited to the particular forms disclosed herein since these are to be regarded as illustrative rather than restrictive.

I claim:

1. A conveyor idler comprising:
   a. an elongated, flexible, solid molded polymer idler member having a plurality of rollers formed thereon each roller having a friction surface molded therein, said idler member having a pair of enlarged end portions molded thereon;
   b. a pair of terminal supports, each said terminal support having a pair of polymer members shaped to enclose one said enlarged end portion of said conveyor idler and a casing holding said pair of polymer members therein; and
   c. mounting means attached to each said terminal support for mounting said terminal support to a conveyor idler support framework whereby a conveyor may be supported by a one-piece flexible and rotatable idler.

2. The apparatus in accordance with claim 1 in which said one-piece elongated polymer flexible idler member is a one-piece molded, elongated ureathane idler member.

3. The apparatus in accordance with claim 2 in which each roller friction surface is a tread which alternates with the tread on each adjacent roller.

4. The apparatus in accordance with claim 3 in which each said terminal support has a water line connected thereinto for feeding water thereinside.

5. The apparatus in accordance with claim 4 in which said mounting means includes a pin passing through each said terminal support for connecting said terminal support to said mounting framework.

6. The apparatus in accordance with claim 5 in which said pin is a stainless steel pin adapted to be hooked into a bifurcated stirrup.

7. The apparatus in accordance with claim 6 in which said terminal supports with polymer members are made from an acetal resin.

8. The apparatus in accordance with claim 3 in which said terminal supports have a grease fitting for applying grease thereinto.

9. The apparatus in accordance with claim 7 in which the enlarged end portions of said idler member has radiused surfaces at the connection with said idler member.

10. A conveyor idler and terminal bearing apparatus comprising in combination:

mounting means for mounting a conveyor idler for supporting a movable conveyor belt;

elongated, flexible conveyor idler having a plurality of rollers formed thereon and having a pair of end portions each having a bearing member attached thereto;

a pair of terminal bearing supports for supporting each said bearing member on each end portion of said elongated, flexible conveyor idler, each said terminal bearing support having a plurality of supporting members at least partially enclosing each said bearing member to support each said bearing member in each said terminal bearing and casing covering said plurality of support members; and at least one pin passing through said casing and support members to said mounting means.

11. The apparatus is accordance with claim 10, in which said casing includes a hollow, cylindrical sleeve, closed at one end, for sliding over a pair of semi-cylindrical support members and having a metal pin passing through said cylindrical sleeve casing and support members and connecting the support members onto said bearing member in said idler.

12. The apparatus in accordance with claim 11 in which said elongated flexible polymer conveyor idler rollers each have a predetermined tread design thereon.

13. The apparatus in accordance with claim 11, in which said bearing member is an enlarged polymer end portion molded onto each end of said idler.

* * * * *